· US010301860B2

United States Patent
Endo et al.

(10) Patent No.: US 10,301,860 B2
(45) Date of Patent: May 28, 2019

(54) OPENING/CLOSING CONTROL DEVICE

(71) Applicant: ALPS ALPINE CO., LTD., Tokyo (JP)

(72) Inventors: Shinichi Endo, Miyagi-ken (JP);
Satoshi Hayasaka, Miyagi-ken (JP);
Takuya Sugita, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 55 days.

(21) Appl. No.: 15/617,262

(22) Filed: Jun. 8, 2017

(65) Prior Publication Data

US 2018/0002968 A1    Jan. 4, 2018

(30) Foreign Application Priority Data

Jul. 1, 2016   (JP) .................................. 2016-131329

(51) Int. Cl.
| | |
|---|---|
| *E05F 15/41* | (2015.01) |
| *B60J 1/17* | (2006.01) |
| *E05F 15/75* | (2015.01) |
| *E05F 15/40* | (2015.01) |
| *E05F 15/695* | (2015.01) |

(52) U.S. Cl.
CPC .................. *E05F 15/41* (2015.01); *B60J 1/17* (2013.01); *E05F 15/40* (2015.01); *E05F 15/695* (2015.01); *E05F 15/75* (2015.01); *E05Y 2400/57* (2013.01); *E05Y 2400/58* (2013.01); *E05Y 2800/748* (2013.01); *E05Y 2900/55* (2013.01)

(58) Field of Classification Search
None
See application file for complete search history.

(56) References Cited

U.S. PATENT DOCUMENTS

| | | | | | |
|---|---|---|---|---|---|
| 6,032,415 | A | * | 3/2000 | Tajima .................... | E05F 15/41 49/26 |
| 6,051,945 | A | * | 4/2000 | Furukawa ............ | H02H 7/0851 318/264 |
| 6,107,712 | A | * | 8/2000 | Yamamura ............ | E05F 15/697 200/11 DA |

(Continued)

FOREIGN PATENT DOCUMENTS

| | | |
|---|---|---|
| EP | 2 476 846 A2 | 7/2012 |
| JP | H08 240071 A | 9/1996 |
| JP | 2012-144923 A | 8/2017 |

OTHER PUBLICATIONS

Extended European Search Report dated Nov. 15, 2017 for European Application No. 17178794.8, 7 pages.

*Primary Examiner* — Todd M Melton
*Assistant Examiner* — Jason R Roberson
(74) *Attorney, Agent, or Firm* — Brinks Gilson & Lione (57) ABSTRACT

A boundary position, which determines the range of the positions of the window within which trap prevention control is disabled, is set according to the sum of a first amount of rotation and a second amount of rotation. The first amount of rotation approximates a change, in a reference amount of rotation, that corresponds to a change in a detected voltage from a reference voltage. The second amount of rotation is set to a value that is smaller than the difference between a specific amount of rotation at a stop and the reference amount of rotation and is larger than the amount of variations in the reference amount of rotation.

8 Claims, 8 Drawing Sheets

(56) References Cited

U.S. PATENT DOCUMENTS

| | | | | |
|---|---|---|---|---|
| 6,114,820 | A | * | 9/2000 | Nishigaya ............. E05F 15/697 160/292 |
| 6,274,947 | B1 | * | 8/2001 | Terashima ........... H02H 7/0851 307/10.1 |
| 2006/0254148 | A1 | * | 11/2006 | Noro ..................... E05F 15/695 49/352 |
| 2012/0180394 | A1 | * | 7/2012 | Shinohara ............... E05F 15/00 49/349 |

* cited by examiner

OPENING/CLOSING CONTROL DEVICE

CLAIM OF PRIORITY

This application claims benefit of priority to Japanese Patent Application No. 2016-131329 filed on Jul. 1, 2016, which is hereby incorporated by reference in its entirety.

BACKGROUND

1. Field of the Disclosure

The present disclosure relates to an opening/disclosing control device such as a power widow device that controls the opening/closing operation of an opening/closing body.

2. Description of the Related Art

A power window device has a function of detecting a trap of a finger or foreign matter according to a change in the torque of a motor. When a trap is detected, control is performed so that an operation to raise the window is changed to an operation to lower the window. When the window reaches an edge of the window frame, however, the torque also changes. If this change is detected as a trap, the window cannot be closed. In view of this, when the position of the window comes close to a predetermined range with respect to the edge of window, the trap detection function is usually disabled. The position of the window is detected according the amount of rotation of the motor, which is indicated by the number of pulses output from a Hall sensor incorporated into the motor. A state immediately after the window has reached the edge of the window frame is taken as a reference. The amount of rotation from this state is detected as the position of the window. (See, for example, Japanese Unexamined Patent Application Publication No. 2012-144923.)

When the window collides with the edge of the window frame, the window bites into the elastic member of the window frame and stops. Even after the window has stopped, the motor is affected by the characteristics of a damper and thereby slightly rotates. Therefore, the amount of rotation of the motor from when the window reaches the edge of the window frame until the motor stops changes depending on temperature characteristic in the hardness of the elastic member and variations in voltage in the motor. In spite of the amount of rotation being reduced, if the position of a boundary between the enabling and disabling of the trap detection function is left unchanged, a collision of the window with the window frame may be detected mistakenly as a trap.

With the power window device described in Japanese Unexamined Patent Application Publication No. 2012-144923, therefore, the position of the boundary between the enabling and disabling of the trap detection function (the position is at the lower end of a non-detected area) is changed according to voltage in the motor. In this power window device, when the amount of rotation (reference pulse value) of the motor that corresponds to the position of the window in a fully closed state (in which the window is locked at the upper end) is corrected according to voltage in the motor, and the amount of rotation (pulse count) of the motor that corresponds to the boundary position is also corrected according to voltage in the motor.

With the power window device in Japanese Unexamined Patent Application Publication No. 2012-144923, however, the difference (width of a the non-detected area) between the amount of rotation of the motor that corresponds to the position of the window in the fully closed state and the amount of rotation of the motor that corresponds to the boundary position is set to a fixed value. Even if the voltage changes, this difference remains the same (see FIG. 7 in Japanese Unexamined Patent Application Publication No. 2012-144923). In practice, the amount of rotation from when an object with the minimum thickness to which a trap must be detected (usually, an object with a thickness of 4 mm) is trapped until the window stops changes depending on the voltage in the motor and temperature, as with the amount of rotation from when the window collides with an edge of the window frame until the window stops, as with the amount of rotation from when the window collides with the edge of the window frame until the window stops. If the width of the non-detected area is set to a fixed value without the former amount of rotation taken into consideration, the trap detection function may be disabled for an object with the minimum thickness to which a trap must be detected.

SUMMARY

An opening/closing control device that controls the opening/closing operation of an opening/closing body by driving a motor includes: a trap detecting unit that detects a trap of an object, the trap being caused by the opening/closing body; a rotation amount detecting unit that detects an amount of rotation of the motor; a voltage detecting unit that detects a voltage to be supplied to the motor; a position detecting unit that detects the position of the opening/closing body with respect to its position with the opening/closing body in a fully closed state, according to a change in the detected amount of rotation from a reference amount of rotation, which is the amount of rotation detected by the rotation amount detecting unit in the fully closed state; a motor control unit that, when the trap detecting unit detects the trap, performs trap prevention control by which the rotation of the motor is reversed if the position, detected by the position detecting unit, of the opening/closing body is more distant from its position in the fully closed state than a preset boundary position is, and disables the trap prevention control if the detected position of the opening/closing body is closer to its position in the fully closed state than the boundary position is; and a boundary position setting unit that sets the boundary position. The boundary position setting unit sets the boundary position according to the sum of a first amount of rotation, the value of which depends on a change in the voltage detected by the voltage detecting unit from a reference voltage, which is a voltage detected by the voltage detecting unit in the fully closed state, the first amount of rotation approximating a change, in the reference amount of rotation, that corresponds to the change in the detected voltage from the reference voltage, and a second amount of rotation, the value of which depends on the detected voltage, the second amount of rotation being smaller than the difference between the reference amount of rotation and a specific amount of rotation at a stop, which is the detected amount of rotation at a position at which the opening/closing body is stopped by the trap prevention control because the trap of the object with a predetermined thickness has been detected, and being larger than an amount of variations in the reference amount of rotation.

In this structure, the boundary position, which determines the range of the positions of the opening/closing body within which the trap prevention control is disabled, is set according to the sum of the first amount of rotation and the second amount of rotation. The first amount of rotation approximates a change, in the reference amount of rotation, that corresponds to a change in the detected voltage from the reference voltage. Therefore, even if the reference amount of rotation changes due to a change in voltage in the motor, the boundary position is appropriately set according to the change. The second amount of rotation is smaller than the difference between the specific amount of rotation at a stop and the reference amount of rotation, and is larger than variations in the reference amount of rotation. Therefore, even if the specific amount of rotation at a stop changes due to a change in voltage in the motor, the boundary position is appropriately set according to the change.

DESCRIPTION OF THE EXEMPLARY EMBODIMENTS

Figure 1:
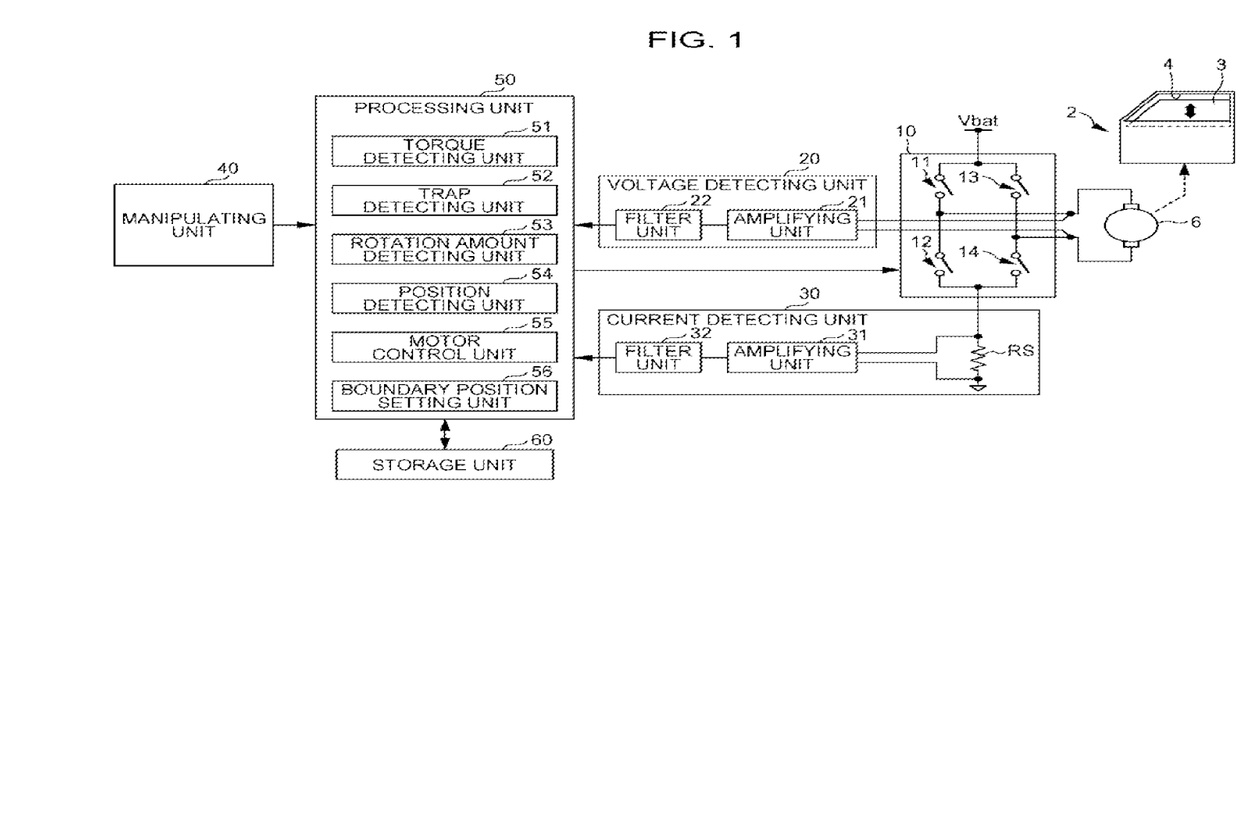
FIG. 1 illustrates an example of the structure of an opening/disclosing control device in an embodiment of the present invention.

FIG. 1 illustrates an example of the structure of an opening/disclosing control device in an embodiment of the present invention. The opening/disclosing control device in the embodiment controls the opening/closing operation of a window 3 (opening/closing body) by driving a motor 6. In the example in FIG. 1, the opening/disclosing control device controls the opening and closing of the window 3 attached to the door frame 4 of a door 2 in a vehicle. The opening/disclosing control device illustrated in FIG. 1 has a motor driving circuit 10, a voltage detecting unit 20, a current detecting unit 30, a manipulating unit 40, a processing unit 50, and a storage unit 60.

The motor driving circuit 10 generates a voltage used to drive the motor 6, in response to a control signal created by a motor control unit 55, described later, in the processing unit 50. In the example in FIG. 1, the motor driving circuit 10 has four switching elements (denoted 11 to 14) that constitute a full bridge circuit. The switching elements 11 and 12 are connected in series between a power supply Vbat, such as a battery, and ground. An intermediate connection point between the switching elements 11 and 12 is connected to one input terminal of the motor 6. The switching elements 13 and 14 are also connected in series between the power supply Vbat and ground. An intermediate connection point between the switching elements 13 and 14 is connected to another input terminal of the motor 6. The motor 6 is, for example, a direct current (DC) motor. Its rotational direction is reversed according to the polarity of a voltage applied across the two input terminal.

The voltage detecting unit 20 detects a voltage to be supplied to the motor 6. In the example in FIG. 1, the voltage detecting unit 20 has an amplifying unit 21 and a filter unit 22. The amplifying unit 21 amplifies a voltage to be applied across the two input terminals of the motor 6 with a predetermined gain. The filter unit 22 removes a switching frequency component from an output signal sent from the amplifying unit 21, and outputs a signal matching an average voltage to be supplied to the motor 6. The voltage detecting unit 20, which has an analog-to-digital (AD) converter, outputs, to the processing unit 50, a digital signal matching a voltage to be supplied to the motor 6.

The current detecting unit 30 detects a current that flows in the motor 6. In the example in FIG. 1, the current detecting unit 30 has a shunt resistor RS, an amplifying unit 31, and a filter unit 32. The shunt resistor RS is disposed in a current path between the full bridge circuit formed by the switching elements 11 to 14 in the motor driving circuit 10 and ground. The shunt resistor RS generates a voltage matching a current that flows in the motor 6. The amplifying unit 31 amplifies a voltage generated in the shunt resistor RS with a predetermined gain. The filter unit 32 removes a switching frequency component from an output signal sent from the amplifying unit 31, and outputs a signal matching an average current that flows in the motor 6. The current detecting unit 30, which has an AD converter, outputs, to the processing unit 50, a digital signal matching a current that flows in the motor 6.

The manipulating unit 40 is an apparatus manipulated by the user to input a signal to the processing unit 50, the signal being used to open or close the window 3. The manipulating unit 40 includes, for example, a switch and the like.

The processing unit 50 controls the entire operation of the opening/disclosing control device. The processing unit 50 includes, for example, a computer that executes processing in response to operation codes in a program stored in the storage unit 60. The processing unit 50 may execute all processing by using the computer or may execute at least part of processing by using a specific hardware circuit (such as a random logic circuit).

The processing unit 50 has a torque detecting unit 51, a trap detecting unit 52, a rotation amount detecting unit 53, a position detecting unit 54, a motor control unit 55, and a boundary position setting unit 56, as functional blocks.

The torque detecting unit 51 detects the torque of the motor 6. For example, according to a current Im detected by the current detecting unit 30 in the motor 6, the torque detecting unit 51 calculates a torque τ from the following equation.

$$\tau = Kt \times Im - Tm \qquad (1)$$

In equation (1), Kt and Tm are each a motor-specific constant.

The current Im may be calculated from the following equation.

$$Im = (V - 2\pi \times Ke/T)/Rm \qquad (2)$$

In equation (2), V represents the voltage (in V) in the motor, T represents the cycle (in s) of one rotation of the motor, and Rm and Ke are each a motor-specific constant. A pulse generator that generates a pulse according to a rotation by a predetermined angle is added to the motor. The cycle T is detected according to the pulse.

The trap detecting unit 52 detects a trap of an object, the trap being caused by the window 3. For example, the trap detecting unit 52 preferably detects a trap according to the torque of the motor 6, the torque being detected by the torque detecting unit 51. Specifically, if the torque detected by the torque detecting unit 51 exceeds a predetermined threshold, the trap detecting unit 52 decides that a trap has occurred.

The rotation amount detecting unit 53 detects the amount of rotation of the motor 6. For example, on the basis that a ripple occurs in the current in the motor 6 each time the motor 6 rotates by a certain angle, the rotation amount detecting unit 53 detects the amount of rotation. Specifically, the rotation amount detecting unit 53 extracts ripples included in the current in the motor 6 and counts the number of ripples to acquire a ripple count corresponding to the amount of rotation of the motor 6.

If a device, such as a Hall sensor, that generates a pulse each time the motor 6 rotates by a certain angle is provided, the rotation amount detecting unit 53 may counts the number of pulses to acquire a pulse count corresponding to the amount of rotation of the motor 6.

In this embodiment, it will be assumed as an example that the amount of rotation detected by the rotation amount detecting unit 53 is reduced by the closing operation and is increased by the opening operation. Therefore, as the detected amount of rotation is reduced, the position of the window 3 comes closer to a fully closed state (a state in which the window 3 has touched an edge of the door frame 4 and has stopped).

Here, the amount of rotation detected by the rotation amount detecting unit 53 with the window 3 in the fully closed state will be referred to as the reference amount Ps of rotation. The position detecting unit 54 detects the position of the window 3 with respect to its position in the fully closed state, according to a change in the detected amount of rotation from the reference amount Ps of rotation. For example, the position detecting unit 54 preferably acquires a change (P−Ps) in the amount P of rotation detected at present from the reference amount Ps of rotation in the most recent fully closed state, as the result of the detection of the position of the window 3.

When the window 3 stops in the fully closed state, the position detecting unit 54 may reset the amount P of rotation detected by the rotation amount detecting unit 53 to zero and may acquire the amount P of rotation obtained by rotation amount detecting unit 53 after the reset as the result of the detection of the position of the window 3 without alteration. Thus, there is no need to store the reference amount Ps of rotation each time the fully closed state is entered and to perform processing to subtract Ps from P, so processing is simplified.

The motor control unit 55 creates a control signal to control the motor 6 in response to a manipulation signal entered into the manipulating unit 40, and outputs the created control signal to the motor driving circuit 10. Specifically, the motor control unit 55 creates a control signal to be output to the motor driving circuit 10 so as to satisfy conditions such as the rotational direction and rotational speed of the motor 6, which are set in advance for each of the closing operation and opening operation.

When the trap detecting unit 52 detects a trap of an object, the motor control unit 55 performs trap prevention control by which the rotation of the motor 6 is reversed. However, the motor control unit 55 disables trap prevention control depending on the position, detected by the position detecting unit 54, of the window 3. Specifically, if the detected position of the window 3 is more distant from its position in the fully closed state than a boundary position X is, the motor control unit 55 performs trap prevention control. If the detected position of the window 3 is closer to its position in the fully closed state than the boundary position X is, the motor control unit 55 disables trap prevention control. The boundary position X is preset by the boundary position setting unit 56, which will be described next.

The boundary position setting unit 56 sets the boundary position X, which indicates the boundary of the positions of the window 3 at which trap prevention control is disabled, according to the voltage detected by the voltage detecting unit 20. Specifically, the boundary position setting unit 56 preferably sets the boundary position X according to the sum of a first amount R1 of rotation, the value of which depends on a change in the voltage detected by the voltage detecting unit 20 with respect to the voltage detected by the voltage detecting unit 20 in the fully closed state (the detected voltage in the fully closed state will be referred to below as the reference voltage Vs) and a second amount R2 of rotation, the value of which also depends on the voltage detected by the voltage detecting unit 20 from the reference voltage Vs.

The method of setting the boundary position X will be described below with reference to FIGS. 2 and 3 before the first amount R1 of rotation and second amount R2 of rotation, on which the boundary position X is based, are described.

Figure 2:
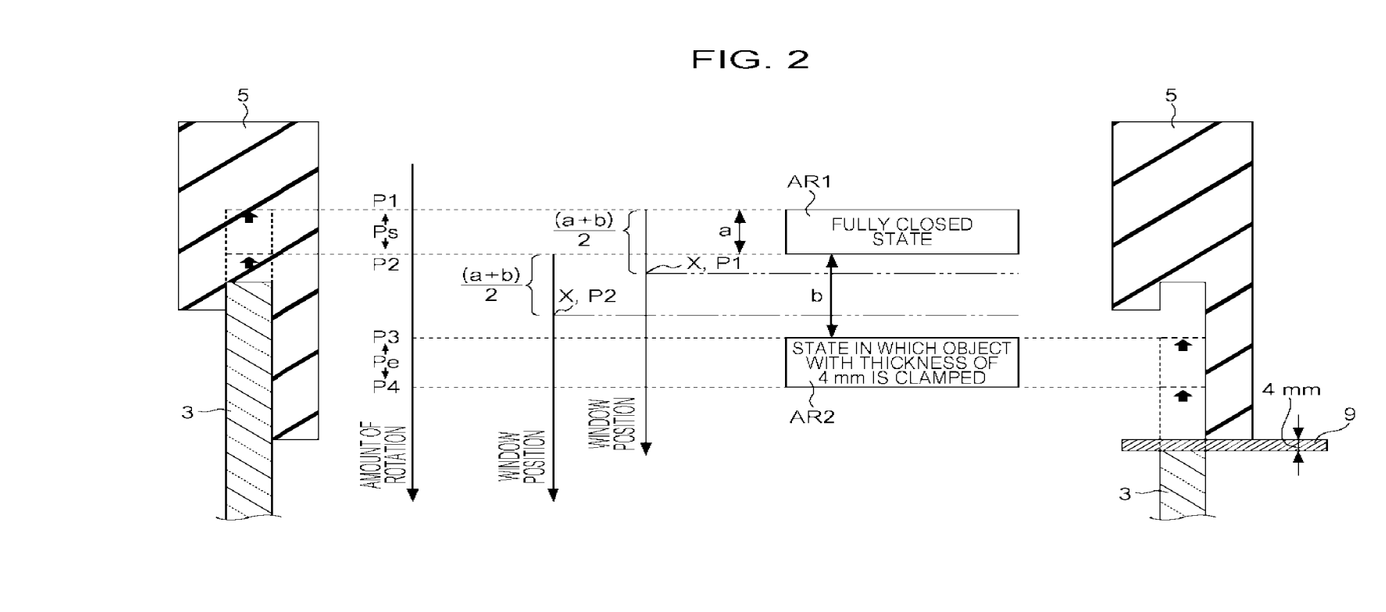
FIG. 2 illustrates a method of setting the position of a boundary between the enabling and disabling of trap prevention control according to a range of variations in the amount of rotation of a motor in a fully closed state and to a range of variations in the amount of rotation of the motor in a case in which an object with a predetermined thickness is trapped.

FIG. 2 illustrates a method of setting the boundary position X between the enabling and disabling of trap prevention control according to a range AR1 of variations in the amount of rotation of the motor 6 in the fully closed state and a range AR2 of variations in the amount of rotation of the motor 6 in a case in which an object 9 with a predetermined thickness is trapped. The left side in FIG. 2 indicates a state in which the window 3 touches an elastic member 5 at the upper edge of the door frame 4, and right side in FIG. 2 indicates a state in which the object 9 with a thickness of 4 mm touches the window 3 and is trapped. When the window 3 is raised by the closing operation and touches the elastic member 5 as illustrated on the left side in FIG. 2, the window 3 is further raised and bites into the elastic member 5 from the touched position and stops, as indicated by the dotted lines and arrows. Even after the window 3 has stopped, the motor 6 slightly rotates. In the example in FIG. 2, the reference amount Ps of rotation, which is the amount of rotation detected by the rotation amount detecting unit 53 with the window 3 in the fully closed state, varies in a range from P1 to P2.

The above is also true for a case in which the window 3 traps the object 9 due to the closing operation. As illustrated on the right side in FIG. 2, the window 3 is further raised and bites into the elastic member 5 from the position at which the window 3 has touched the object 9 and stops. The window 3 is stopped by trap prevention control performed by the motor control unit 55. Even after the window 3 has stopped, the motor 6 slightly rotates. Here, the amount of rotation at the maximum bite into the object 9 will be referred to as the specific amount Pe of rotation at a stop, which is the amount of rotation detected by the rotation amount detecting unit 53 at a position at which the window 3 is stopped by trap prevention control because a trap of the object 9 with a predetermined thickness (4 mm in the example in FIG. 2) has been detected. In the example in FIG. 2, the specific amount Pe of rotation at a stop varies in a range from P3 to P4.

If the boundary position X is included in the variation range AR1 of the reference amount Ps of rotation (P1≤Ps≤P2), trap prevention control may be performed in spite of the fact that the window 3 has reached the fully closed state. In this case, the window 3 stops at a position distant from the position in the fully closed state in the opening direction. This prevents the window 3 from being fully closed. Therefore, the boundary position X must not be included in the variation range AR1 of the reference amount Ps of rotation. Here, the length of the variation range AR1 of the reference amount Ps of rotation will be denoted "a". Then, the boundary position X must satisfy the following condition.

$$a < X \tag{3}$$

If the boundary position X is included in the variation range AR2 of the specific amount Pe of rotation at a stop (P3≤Pe≤P4), trap prevention control may be disabled in spite of the fact that the window 3 is trapping the object 9. Therefore, the boundary position X must not be included in the variation range AR2 of the specific amount Pe of rotation at a stop. Here, the value obtained by subtracting the maximum value P2 of the variation range AR1 of the reference amount Ps of rotation from the minimum value P3 of the variation range AR2 of the specific amount Pe of rotation at a stop (minimum difference between the specific amount Pe of rotation at a stop and the reference amount Ps of rotation) will be denoted "b". Then, the boundary position X must satisfy the following condition.

$$X < b \tag{4}$$

The following condition is derived from equations (3) and (4).

$$a < X < b \tag{5}$$

It is found from equation (5) that "a" must be smaller than "b".

To reliably satisfy the condition in equation (5) in the case in which the value of "X−a" or the value of "b−X", whichever is smaller, is selected, the boundary position X is preferably set so that the selected value is maximized. Since the selected value is maximized when "X−a" and "b−X" are equal, the boundary position X that satisfies this condition is represented as in the equation below.

"X−a=b−X"

$$X = (a+b)/2 \tag{6}$$

In the example in FIG. 2, the boundary position X (P1) applied when the reference amount Ps of rotation is the minimum value P1 and the boundary position X (P2) applied when the reference amount Ps of rotation is the maximum value P2 are each indicated by a chained line. The boundary position X (P1) is closest to the variation range AR1 of the reference amount Ps of rotation, and the boundary position X (P2) is closest to the variation range AR2 of the specific amount Pe of rotation at a stop. As long as the condition that "a" is smaller than "b" (a<b) is satisfied, the boundary position X represented as in equation (6) is not included in either of the two variation ranges AR1 and AR2.

Figure 3:
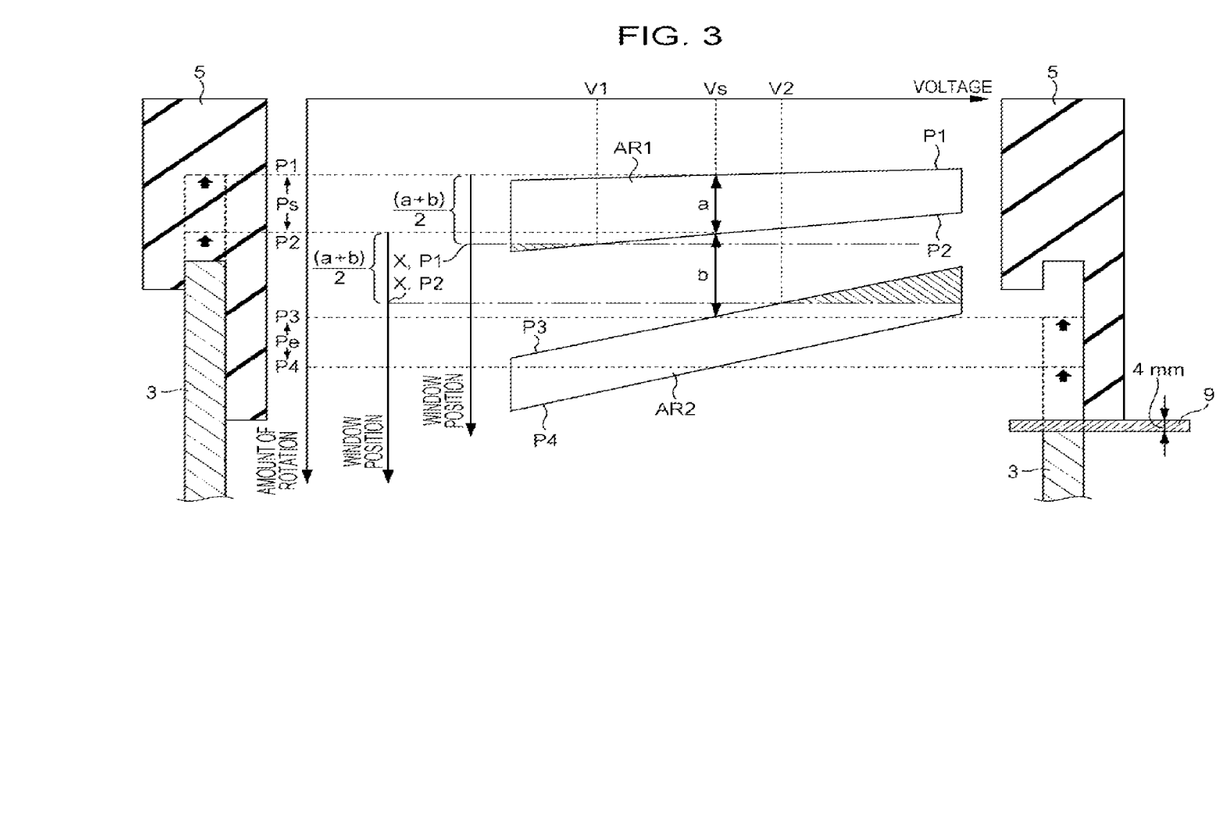
FIG. 3 illustrates a case in which the boundary position set by the method in FIG. 2 becomes inappropriate at a different voltage.

FIG. 3 illustrates a case in which the boundary position X set by the method in FIG. 2 at a specific voltage becomes inappropriate at a different voltage. The two variation ranges AR1 and AR2 in FIG. 2 apply when a specific voltage is supplied to the motor 6. If voltage in the motor 6 changes, the two variation ranges AR1 and AR2 also change as illustrated in FIG. 3. In the example in FIG. 3, the boundary position X is calculated from equation (6) by using "a" and "b" in a case in which voltage in the motor 6 in the fully closed state is Vs. X (P1) in FIG. 3 is set to a value distant, in the opening direction, by (a+b)/2 from the minimum value P1 of the reference amount Ps of rotation in the case in which voltage in the motor 6 in the fully closed state is Vs. X (P2) in FIG. 3 is set to a value distant, in the opening direction, by (a+b)/2 from the maximum value P2 of the reference amount Ps of rotation in the case in which voltage in the motor 6 in the fully closed state is Vs. As illustrated in FIG. 3, when voltage in the motor 6 in the fully closed state is Vs, neither the boundary position X (P1) nor X (P2) is included in the two variation ranges AR1 and AR2.

However, the reference amount Ps of rotation and the specific amount Pe of rotation at a stop tend to change depending on voltage in the motor 6, as illustrated in FIG. 3. Specifically, when voltage is raised, the reference amount Ps of rotation and the specific amount Pe of rotation at a stop tend to be linearly reduced; when voltage is lowered, they tend to be linearly increased. Therefore, when voltage in the motor 6 is changed from the initial voltage Vs, the boundary position X, which has been optimum at Vs, may be included in the variation range AR1 or AR2 at a different voltage. In the example in FIG. 3, if voltage in the motor 6 becomes lower than V1, the boundary position X (P1) is included in the hatched area in the variation range AR1. As a result, trap prevention control is enabled when the window 3 is closed. This may reverse the operation of the window 3 mistakenly. If voltage in the motor 6 becomes higher than V2, the boundary position X (P2) is included in the hatched area in the variation range AR2. As a result, trap prevention control is disabled when the object 9 is trapped. This may prevent the operation of the window 3 from being reversed.

If the variation range AR1 of the reference amount Ps of rotation and the variation range AR2 of the specific amount Pe of rotation at a stop each change depending on voltage in the motor 6 as described above, the first amount R1 of rotation and the second amount R2 of rotation are stipulated as described below to prevent the boundary position X from being included in these variation ranges.

The first amount R1 of rotation is the amount of rotation of the motor 6 that approximates a change ΔPs, in the reference amount Ps of rotation, that corresponds to a detected voltage change ΔV from the reference voltage Vs. If it is approximated that the change ΔPs in the reference amount Ps of rotation is proportional to the detected voltage change ΔV from the reference voltage Vs, the first amount R1 of rotation is represented as in the equation below.

$$R1 = \alpha s \times (V - Vs) \tag{7}$$

In equation (7), αs indicates a proportionality coefficient, Vs indicates the voltage (reference voltage) detected by the voltage detecting unit 20 in the most recent fully closed state, and V indicates the voltage detected by the voltage detecting unit 20 in the calculation of the first amount R1 of rotation. "V−Vs" is equivalent to ΔV.

The minimum value P1 and maximum value P2 of the variation range AR1 of the reference amount Ps of rotation each can preferably approximate a linear function of the detected voltage V. The approximation function (first approximation function) of the minimum value P1 and the approximation function (second approximation function) of the maximum value P2 can be represented as in the following equations.

$$P1 = \alpha 1 \times V + \beta 1 \tag{8}$$

$$P2 = \alpha 2 \times V + \beta 2 \tag{9}$$

The proportionality coefficient αs in equation (7) is preferably set to, for example, an intermediate value between the coefficient α1 in the first approximation function and the coefficient α2 in the second approximation function. In this case, the proportionality coefficient αs is represented as in the equation below.

$$\alpha s = (\alpha 1 + \alpha 2)/2 \qquad (10)$$

The second amount R2 of rotation is the amount of rotation of the motor 6 that is smaller than the difference between the specific amount Pe of rotation at a stop and the reference amount Ps of rotation and is larger than the amount of variations in the reference amount Ps of rotation. The second amount R2 of rotation is given by, for example, applying "a" and "b", which vary depending on voltage in the motor 6, to equation (6).

Specifically, the second amount R2 of rotation is represented as in the equation below by using, in equation (6), the minimum value P1 of the variation range AR1 and the minimum value P3 of the variation range AR2.

$$R2 = \frac{[(P2 - P1) + (P3 - P2)]}{2} \qquad (11)$$
$$= \frac{(P3 - P1)}{2}$$

The minimum value P3 of the variation range AR2 can preferably approximate a linear function of the detected voltage V. This approximation function (third approximation function) can be represented as in the equation below.

$$P3 = \alpha 3 \times V + \beta 3 \qquad (12)$$

In equation (12), α3 and β3 are each a coefficient.

If equation (8) and equation (12) are assigned to equation (11), the second amount R2 of rotation is represented as in the equation below.

$$R2 = [(\alpha 3 - \alpha 1) \times V + (\beta 3 - \beta 1)]/2 \qquad (13)$$

The boundary position X, which is equivalent to the sum of the first amount R1 of rotation and the second amount R2 of rotation, is represented as in the equation below.

$$X = R1 + R2 \qquad (14)$$
$$= \alpha th \times V + \beta th + \alpha s \times (V - Vs)$$

In equation (14), αth and βth are each a constant, which are represented as in the equations below.

$$\alpha th = (\alpha 3 - \alpha 1)/2 \qquad (15)$$

$$\beta th = (\beta 3 - \beta 1)/2 \qquad (16)$$

The boundary position setting unit 56 calculates the boundary position X from equation (14), on the basis of the reference voltage Vs in the most recent fully closed state and the voltage V detected at present.

Figure 4:
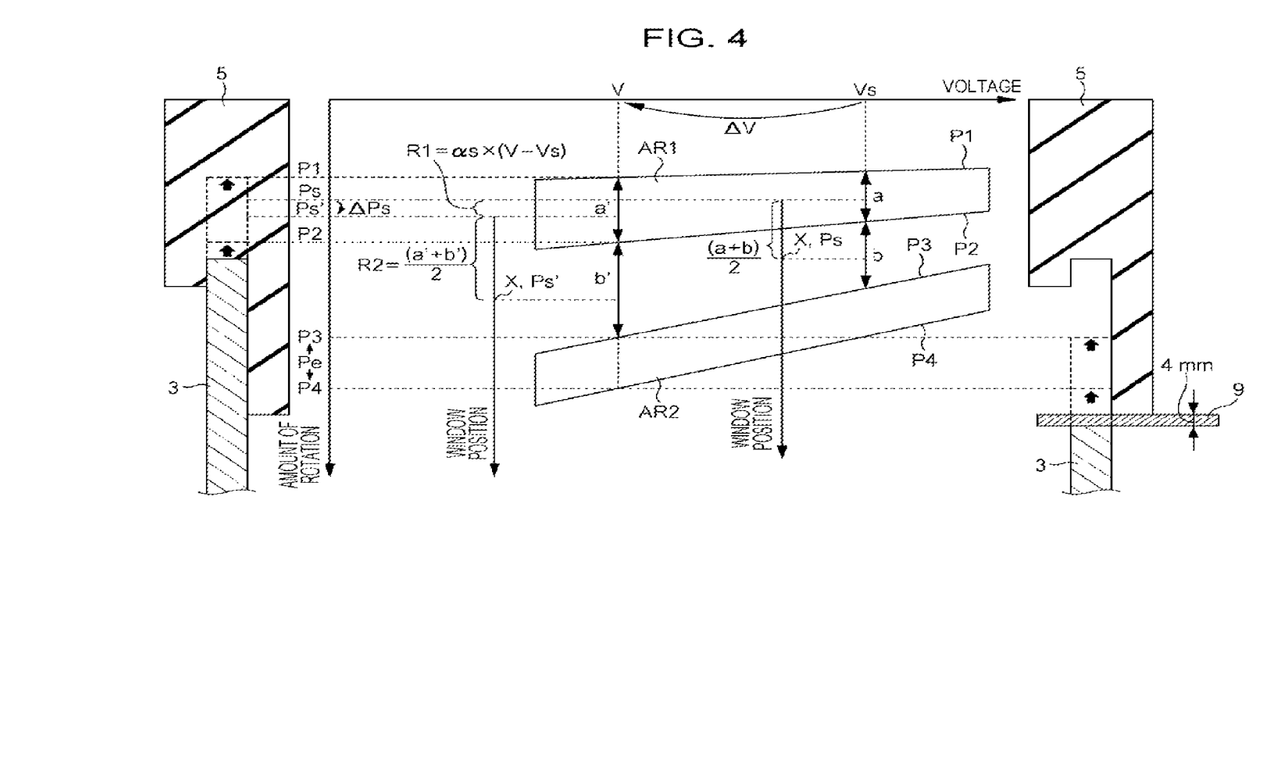
FIG. 4 illustrates an example of a method of setting a boundary position in the opening/disclosing control device in the embodiment of the present invention.

FIG. 4 illustrates an example of a method of setting the boundary position X. In the example in FIG. 4, the reference voltage in the most recent fully closed state is Vs and the reference amount of rotation is Ps. If voltage in the motor 6 is Vs, the length (P2−P1) of the variation range AR1 is "a" and the difference (P3−P2) between the minimum value P3 of the variation range AR2 and the maximum value P2 of the variation range AR1 is "b". If voltage in the motor 6 remains unchanged at Vs, the boundary position X (Ps) with respect to the reference amount Ps of rotation is set to a position distant by (a+b)/2 from the reference amount Ps of rotation in the opening direction.

If voltage in the motor 6 changes from Vs to V, the reference voltage in the most recent fully closed state is assumed to have been virtually increased by ΔPs, from Ps to Ps'. The first amount R1 of rotation equivalent to this ΔPs is obtained from "αs×(V−Vs)" in equation (7).

In the example in FIG. 4, if voltage in the motor 6 is V, the length of the variation range AR1 is a' and the difference between the minimum value P3 of the variation range AR2 and the maximum value P2 of the variation range AR1 is b'. The boundary position X (Ps') with respect to the virtual reference amount Ps' of rotation is set to a position distant by (a'+b')/2 from the reference amount Ps' of rotation in the opening direction. This (a'+b')/2 is equivalent to the second amount R2 of rotation.

The boundary position X (Ps') with respect to the reference amount Ps' of rotation is set to a position distant by (R1+R2) from the reference amount Ps of rotation in the opening direction. Therefore, when the reference voltage in the most recent fully closed state is Vs and the voltage detected at present is V, the boundary position X (Ps) is represented by the sum of the first amount R1 of rotation and the second amount R2 of rotation as indicated by equation (14).

This completes the description of the processing unit 50.

FIG. 1 will be referenced again.

The storage unit 60 stores programs executed by the computer in the processing unit 50, constant data used in processing by the processing unit 50, variable data that is temporarily stored during a process of processing by the processing unit 50, and the like. The storage unit 60 includes a storage device such as, for example, a dynamic random access memory (DRAM), a static random access memory (SRAM), a flash memory, or a hard disk drive.

Figure 5:
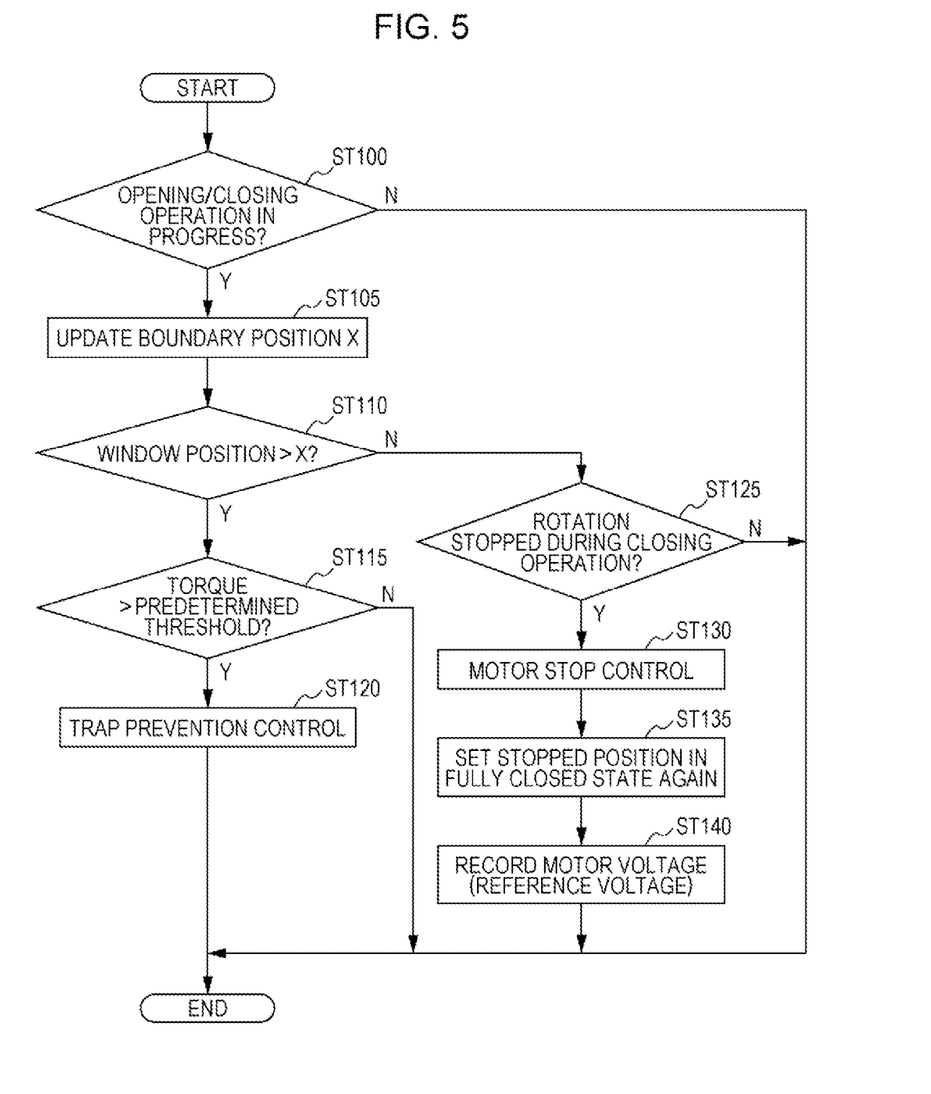
FIG. 5 is a flowchart illustrating the operation of the opening/disclosing control device in the embodiment of the present invention.

Next, the operation of the opening/disclosing control device, structured as described above, in this embodiment will be described with reference to the flowchart in FIG. 5. Processing in FIG. 5 is repeatedly executed at intervals of, for example, a certain period. Alternatively, the processing may be executed when a pulse generated by a magnetic sensor such as a Hall sensor and output from the motor 6 is changed.

The boundary position setting unit 56 decides whether the opening/closing operation of the window 3 is currently being performed (ST100). If the opening/closing operation is being performed, the boundary position setting unit 56 uses the reference voltage Vs in the most recent fully closed state and the voltage V detected at present to calculate the boundary position X according to equation (14) (ST105).

After the boundary position X has been calculated by the boundary position setting unit 56, the motor control unit 55 decides whether the value of the current position, detected by the position detecting unit 54, of the window 3 is larger than the value of the boundary position X (ST110). If the value of the current position of the window 3 is larger than the value of the boundary position X, that is, the current position of the window 3 is more distant from the position in the fully closed state than the boundary position X is, the motor control unit 55 further decides whether the value of the torque detected by the torque detecting unit 51 is larger than a predetermined threshold (ST115). If the value of the detected torque is larger than the predetermined threshold, the motor control unit 55 performs trap prevention control, by which the rotation of the motor 6 is reversed (ST120).

If the motor control unit 55 decides in ST110 that the value of the current position of the window 3 is equal to smaller than the value of the boundary position X, that is, the current position of the window 3 is closer to the position in the fully closed state than the boundary position X is, the motor control unit 55 advances the window 3 to the position in the fully closed state and then stops the rotation of the motor 6 (ST130). For example, the motor control unit 55 rotates the motor 6 in the closing direction for a preset time and then stops the rotation. When the rotation of the motor 6 stops, the position detecting unit 54 sets the position of the window 3 in this stopped state as the position of a new reference (ST135). Specifically, the position detecting unit 54 resets the value of the amount of rotation detected by the rotation amount detecting unit 53 to zero. The boundary position setting unit 56 acquires a voltage detected by the voltage detecting unit 20 in this stopped state as the reference voltage Vs, and stores it in the storage unit 60 (ST140). The boundary position setting unit 56 uses the reference voltage Vs stored in the storage unit 60 in the calculation of the boundary position X.

Figure 6:
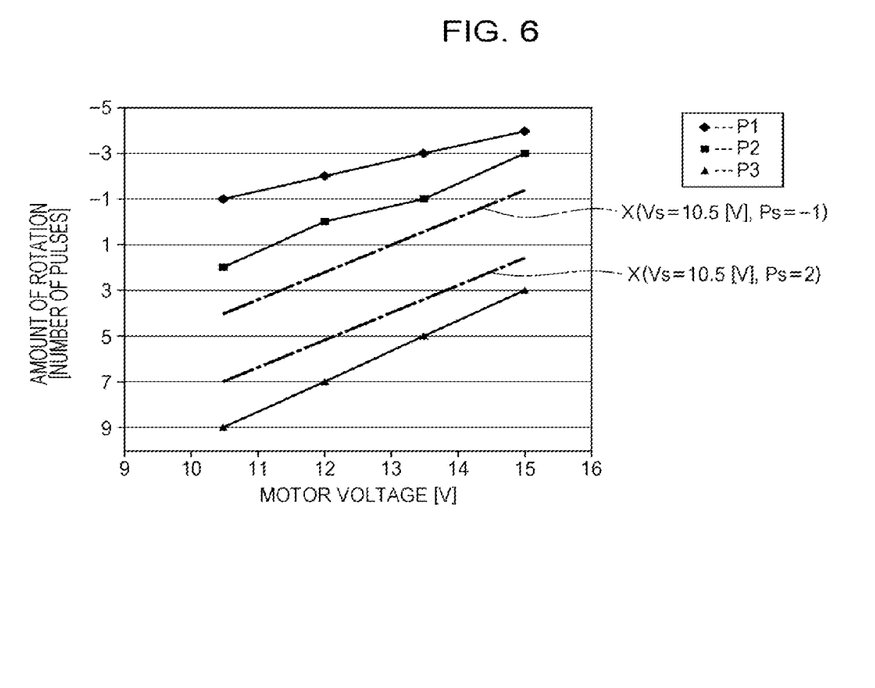
FIG. 6 illustrates an example of boundary position setting in the opening/disclosing control device in the embodiment of the present invention.

FIG. 6 illustrates an example of setting the boundary position X in the opening/disclosing control device in this embodiment. In FIG. 6, the horizontal axis indicates voltage supplied to the motor 6 and the vertical axis indicates the amount of rotation of the motor 6. The unit of the amount of rotation is the number of pulses, one pulse being generated by a Hall sensor or the like each time the motor 6 is rotated by a certain angle. P1 indicates the minimum value of the reference amount Ps of rotation, P2 indicates the maximum value of the reference amount Ps of rotation, and P3 indicates the minimum value of the specific amount Pe of rotation at a stop.

In FIG. 6, the upper dash-dot line indicates the amount of rotation at the boundary position X under the conditions that the reference voltage Vs is 10.5 V and the reference amount Ps of rotation is the minimum value, which is −1, and the lower dash-dot line indicates the amount of rotation at the boundary position X under the conditions that the reference voltage Vs is 10.5 V and the reference amount Ps of rotation is the maximum value, which is 2. In the entire voltage range (10.5 V to 15 V), the amount of rotation at the boundary position X indicated by these two dash-dot lines is smaller than the minimum value P3 of the specific amount Pe of rotation at a stop and is larger than the maximum value P2 of the reference amount Ps of rotation. Therefore, the stopping of the window 3 in the fully closed state is not detected mistakenly as a trap, and trap prevention control is not disabled when the object 9 with a certain thickness is trapped.

Figure 7:
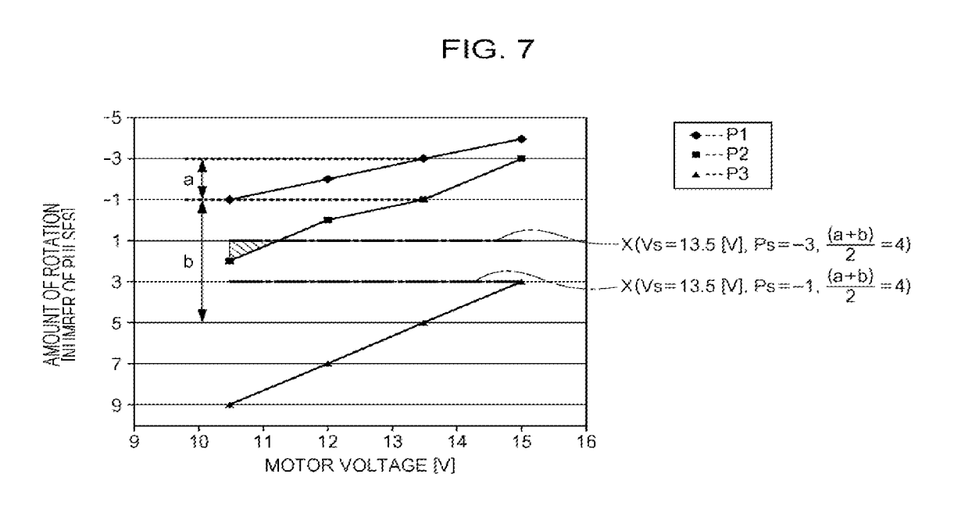
FIG. 7 illustrates an example in which the boundary position becomes inappropriate at a different voltage.
Figure 8:
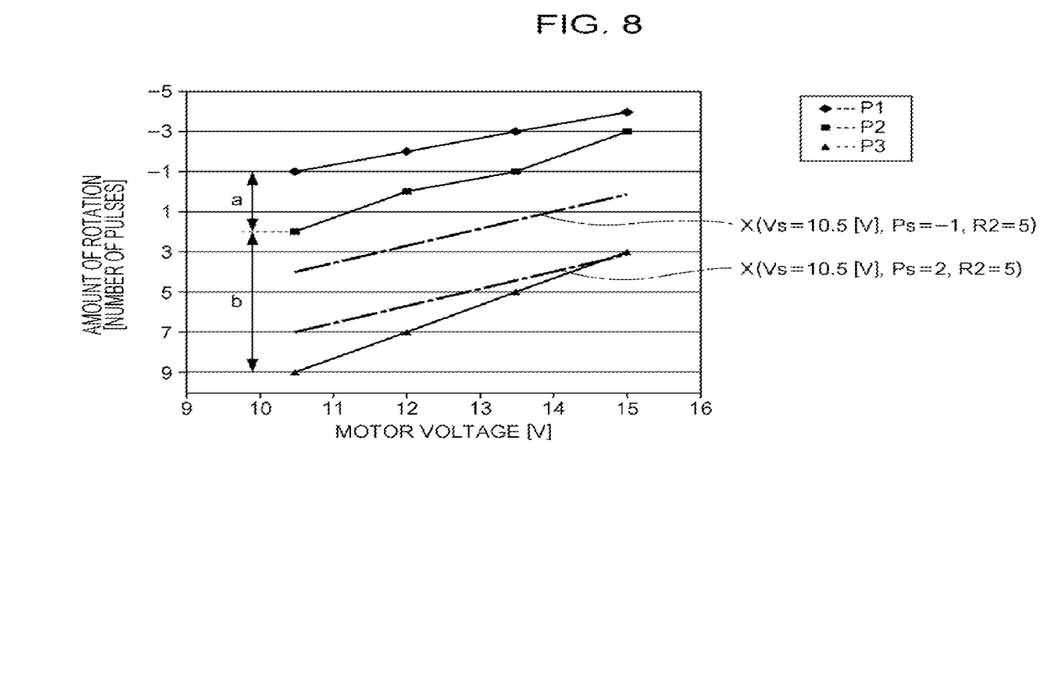
FIG. 8 illustrates a case in which a second amount of rotation is fixed.

FIGS. 7 and 8 illustrate comparative examples of the example of setting the boundary position X in FIG. 6.

FIG. 7 illustrates an example in which the boundary position X becomes inappropriate at a different voltage. When voltage in the motor 6 is 13.5 V, the value of (a+b)/2 in the example in FIG. 7 is 4. The two dash-dot lines each indicate the amount of rotation at the boundary position X. The difference between the amount of rotation at the boundary position X and the reference amount Ps of rotation is fixed to 4. With the upper dash-dot line, the reference amount Ps of rotation is −3 and the amount of rotation at the boundary position X is 1. With the lower dash-dot line, the reference amount Ps of rotation is −1 and the amount of rotation at the boundary position X is 3. The value −3 of the reference amount Ps of rotation is the minimum value P1 of the reference amount Ps of rotation when voltage in the motor 6 is 13.5 V, and the value −1 of the reference amount Ps of rotation is the maximum value P3 of the reference amount Ps of rotation when voltage in the motor 6 is 13.5 V.

If, in the example in FIG. 7, when voltage in the motor 6 falls to or below 11 V (hatched range), the reference amount Ps of rotation on the upper dash-dot line becomes smaller than the maximum value P2. In the hatched range, therefore, the stopping of the window 3 in the fully closed state may be detected mistakenly as a trap. When voltage in the motor 6 is about 15 V, the lower dash-dot line overlaps the minimum value P3 (=3) of the specific amount Pe of rotation at a stop. Around the voltage, therefore, trap prevention control may not work for the object 9 with a certain thickness.

FIG. 8 illustrates an example in which the second amount R2 of rotation is replaced with a certain value that does not depend on the detected voltage V at the boundary position X represented as in equation (14). The upper dash-dot line indicates the amount of rotation at the boundary position X under the conditions that the reference voltage Vs is 10.5 V and the reference amount Ps of rotation is the minimum value, which is −1, and the lower dash-dot line indicates the amount of rotation at the boundary position X under the conditions that the reference voltage Vs is 10.5 V and the reference amount Ps of rotation is the maximum value, which is 2. At these boundary positions X, the second amount R2 of rotation is fixed to 5. The value 5 is calculated from (a+b)/2 by using "a" and "b" applied in the case in which voltage in the motor 6 is 10.5 V.

In the example in FIG. 8, when voltage in the motor 6 is around 15 V, the lower dash-dot line overlaps the minimum value P3 (=3) of the specific amount Pe of rotation at a stop. This is because the inclination of the straight line for P3 with respect to voltage changes is larger than the inclinations of the straight lines for P1 and P2 with respect to voltage changes. Around 15 V, therefore, trap prevention control may not work for the object 9 with a certain thickness.

As described above, with the opening/disclosing control device in this embodiment, the boundary position X, which determines the range of the positions of the window 3 within which trap prevention control is disabled, is set according to the sum of the first amount R1 of rotation and the second amount R2 of rotation. The first amount R1 of rotation approximates a change, in the reference amount Ps of rotation, that corresponds to a change in the detected voltage from the reference voltage Vs. Therefore, even if the reference amount Ps of rotation changes due to a change in voltage in the motor 6, the boundary position X can be appropriately set according to the change. The second amount R2 of rotation is smaller than the difference (b) between the specific amount Pe of rotation at a stop and the reference amount Ps of rotation and is larger than the amount (a) of variations in the reference amount Ps of rotation. Therefore, even if the specific amount Pe of rotation at a stop changes due to a change in voltage in the motor 6, the boundary position X can be appropriately set according to the change. Accordingly, trap prevention control can be accurately disabled when the window 3 reaches the position in the fully closed state and can be accurately executed when the object 9 with a certain thickness is trapped.

With the opening/disclosing control device in this embodiment, the first amount R1 of rotation is proportional to a change in the detected voltage from the reference voltage Vs, as represented in equation (7). Therefore, if the reference amount Ps of rotation changes in proportion to a change in voltage in the motor 6, the boundary position X can be appropriately set according to the change. The second amount R2 of rotation is calculated as a linear function of the detected voltage, as represented in equation (13). Therefore, if the specific amount Pe of rotation at a stop is approximated as a linear function of the detected voltage, the boundary position X can be appropriately set according to a change in the specific amount Pe of rotation at a stop that is caused by a change in voltage in the motor 6.

With the opening/disclosing control device in this embodiment, if the minimum value P1 and maximum value P2 in the variation range AR1 of the reference amount Ps of rotation each are approximated as a linear function of the detected voltage, an intermediate value between coefficients in the linear functions of the minimum value P1 and maximum value P2 is used as the proportionality coefficient $\alpha s$ to calculate the first amount R1 of rotation, as represented in equation (10). The first amount R1 of rotation can be calculated by which a change in the reference amount Ps of rotation that corresponds to a detected voltage change from the reference voltage Vs is appropriately approximated.

With the opening/disclosing control device in this embodiment, the second amount R2 of rotation is calculated by applying the amount "a" of variations, which is obtained by subtracting the minimum value P1 of the variation range AR1 of the reference amount Ps of rotation from the maximum value P2 of the variation range AR1, and the amount "b" of variations, which is obtained by subtracting the maximum value P2 of the variation range AR1 of the reference amount Ps of rotation from the minimum value P3 of the variation range AR2 of the specific amount Pe of rotation at a stop, to (a+b)/2. Therefore, as long as "a" is smaller than "b", it is possible to satisfy the condition that the second amount R2 of rotation is smaller than "b" and is larger than "a".

The present invention is not limited only to the embodiment described above. The present invention includes various variations.

For example, in the embodiment described above, the minimum value P1 and maximum value P2 in the variation range AR1 of the reference amount Ps of rotation and the minimum value P3 in the variation range AR2 of the specific amount Pe of rotation at a stop are each approximated as a linear function as indicated by equations (8), (9), and (12), and a function including constants in these approximation functions is used to calculate the boundary position X as indicated by equation (14). By contrast, in another embodiment of the present invention, a data table, equivalent to equation (14), for the boundary position X, may be prepared in advance and the boundary position X associated with Vs and V may be acquired from the data table.

In the above embodiment, an example in which the present invention is applied to an opening/closing control device (such as a power window) for a window of a vehicle has been described. However, the present invention is not limited to this. The present invention can be applied to other various opening/closing control devices for sun rooms and sliding doors.

What is claimed is:
1. A window control device that controls a window operation of a window by driving a motor, the device comprising:
a processor and a memory having program code stored therein, wherein when the processor executes the program code, the processor is configured into:
a trap detecting unit configured to detect a trap of an object, the trap being caused by the window;
a rotation amount detecting unit configured to detect an amount of rotation of the motor;
a voltage detecting unit configured to detect a voltage to be supplied to the motor;
a position detecting unit configured to detect a position of the window with respect to the position of the window with the window in a most recent fully closed state, according to a change in a detected amount of rotation from a reference amount of rotation, the reference amount of rotation being the amount of rotation detected by the rotation amount detecting unit in the most recent fully closed state;
a motor control unit configured to perform trap prevention control when the trap detecting unit detects the trap, a rotation of the motor being reversed in the trap prevention control, when the position, detected by the position detecting unit, of the window is more distant from the position of the window in the most recent fully closed state than a preset boundary position is, and to disable the trap prevention control when the detected position of the window is closer to the position of the window in the most recent fully closed state than the boundary position is; and
a boundary position setting unit configured to set the boundary position; and
wherein the boundary position setting unit sets the boundary position according to a sum of a first amount of rotation having a value obtained by multiplying the change in the detected voltage from a reference voltage by a predetermined proportionality coefficient, and a second amount of rotation having a value of a predetermined linear function, the detected voltage being used as a variable in the predetermined linear function and the reference voltage is a detected voltage in the most recent fully closed state.

2. The window control device according to claim 1, wherein the program code further configures the processor into a torque detecting unit configured to detect a torque of the motor, wherein the trap detecting unit detects the trap according to the torque detected by the torque detecting unit.

3. The window control device according to claim 1, wherein the position detecting unit detects a change in the detected amount of rotation from the reference amount of rotation in the most recent fully closed state, as the position of the window.

4. The window control device according to claim 3, wherein the boundary position setting unit calculates a change in the detected voltage from the reference voltage in the most recent fully closed state, and sets the boundary position according to the sum of the first amount of rotation having the value depending on the change in the detected voltage, and the second amount of rotation.

5. The window control device according to claim 4, wherein the program code further configures the processor into a torque detecting unit configured to detect a torque of the motor, wherein the trap detecting unit detects the trap according to the torque detected by the torque detecting unit.

6. The window control device according to claim 1, wherein the boundary position setting unit calculates a change in the detected voltage from the reference voltage in the most recent fully closed state, and sets the boundary position according to the sum of the first amount of rotation having the value depending on the change in the detected voltage, and the second amount of rotation.

7. The window control device according to claim 6, wherein the program code further configures the processor into a torque detecting unit configured to detect a torque of the motor, wherein the trap detecting unit detects the trap according to the torque detected by the torque detecting unit.

8. The window control device according to claim 1, wherein the program code further configures the processor into a torque detecting unit configured to detect a torque of the motor, wherein the trap detecting unit detects the trap according to the torque detected by the torque detecting unit.

* * * * *